United States Patent [19]

Yokoi

[11] Patent Number: 4,828,157

[45] Date of Patent: May 9, 1989

[54] PIN TRACTOR ASSEMBLY

[75] Inventor: Takeshi Yokoi, Kagamigahara, Japan

[73] Assignee: Brother Kogyo Kabushiki Kaisha, Aichi, Japan

[21] Appl. No.: 177,317

[22] Filed: Apr. 4, 1988

[30] Foreign Application Priority Data

Apr. 8, 1987 [JP] Japan ............ 62-86303

[51] Int. Cl.⁴ ............ G03B 1/30; B65H 70/22

[52] U.S. Cl. ............ 226/74; 400/616

[58] Field of Search ............ 226/74, 75, 87, 170; 400/616-616.3, 616.2

[56] References Cited

U.S. PATENT DOCUMENTS

| | | | |
|---|---|---|---|
| 2,140,028 | 12/1938 | Nichols | 400/616.2 |
| 2,285,197 | 6/1942 | Euth | 400/616 |
| 3,688,959 | 9/1972 | Staneck et al. | 226/75 |
| 3,825,162 | 7/1974 | Hubbard . | |
| 3,930,601 | 1/1976 | Masuda . | |
| 3,938,721 | 2/1976 | Staneck et al. | 226/75 |
| 4,129,239 | 12/1978 | Hubbard . | |
| 4,159,794 | 7/1979 | Seitz | 226/75 |
| 4,194,660 | 3/1980 | Seitz . | |
| 4,214,691 | 7/1980 | Van Namen . | |
| 4,421,261 | 12/1983 | Hubbard . | |
| 4,453,660 | 6/1984 | Cornell et al. . | |
| 4,614,287 | 9/1986 | Ueno et al. . | |
| 4,682,904 | 7/1987 | Yoshimura | 226/74 X |

*Primary Examiner*—Donald Watkins
*Attorney, Agent, or Firm*—Oliff & Berridge

[57] ABSTRACT

A pin tractor assembly for feeding a medium having feed perforations such that the perforations engage drive pins provided on an outer surface of a rotating endless belt which engages a pair of wheels rotatably supported between two spaced-apart frames. The two spaced-apart frames are connected to each other by a connecting portion, into an integral tractor body having a slot portion which accommodates the pair of wheels and the endless belt. The assembly has a device for inhibiting radial movement of the pair of wheels positioned in the slot portion of the tractor body.

12 Claims, 6 Drawing Sheets

FIG.3
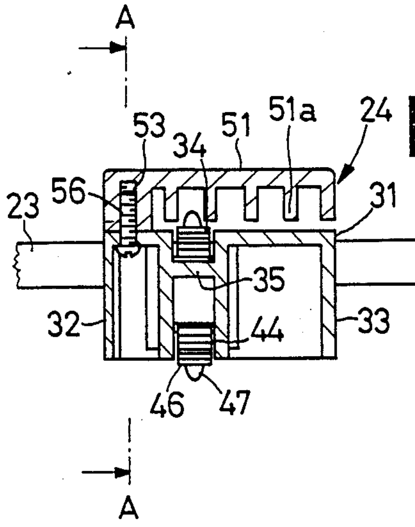
FIG.4
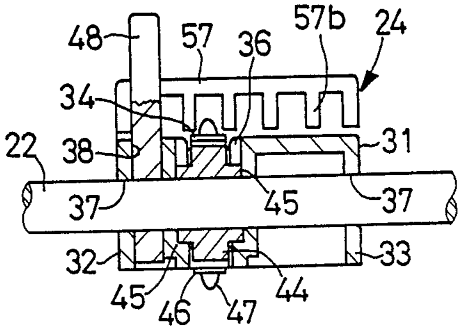
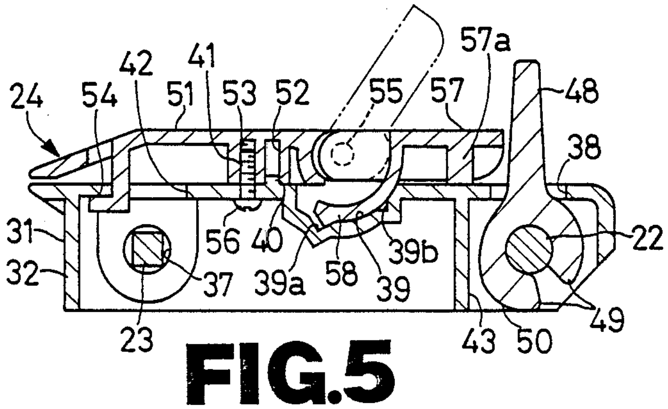
FIG.5
FIG.7
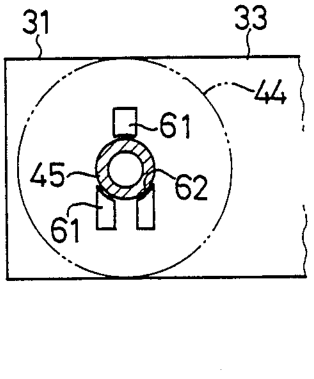

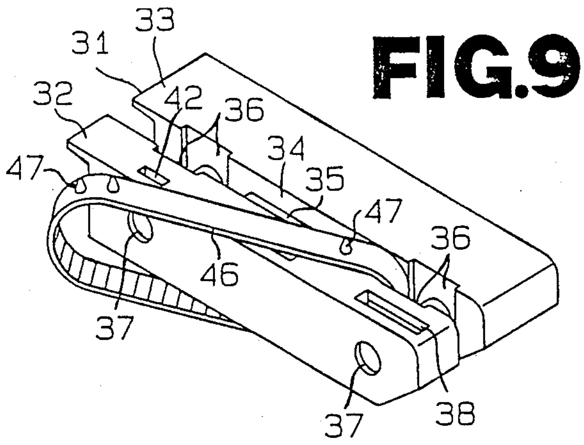
FIG.9(a)
FIG.9(b)
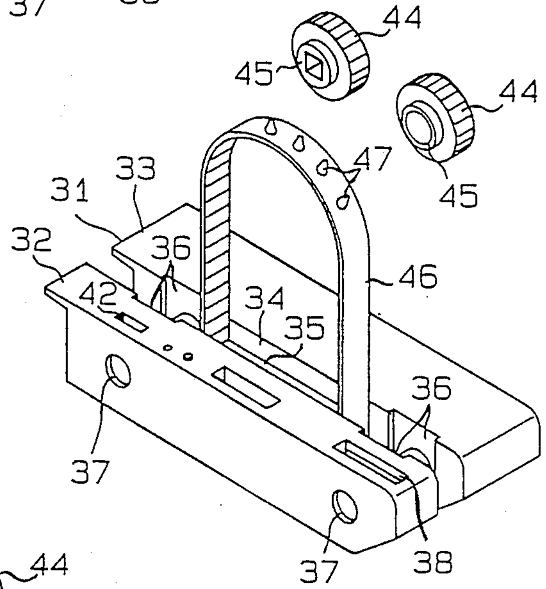
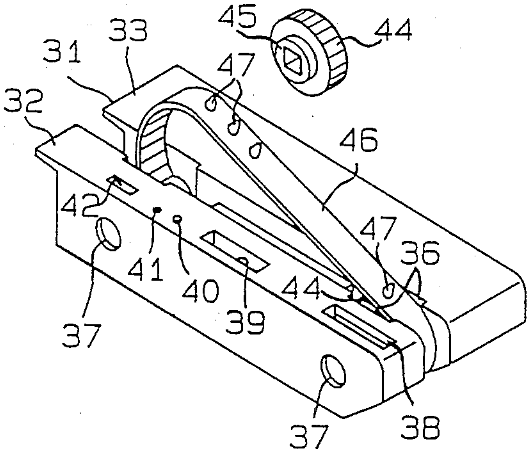
FIG.9(c)

PIN TRACTOR ASSEMBLY

BACKGROUND OF THE INVENTION

1. Field of the Invention

The present invention relates to a pin tractor assembly for feeding a recording or other medium having perforations, such that the perforations engage drive pins arranged on an outer surface of a rotating endless belt which engages a pair of wheels rotatably supported between two spaced-apart frames.

2. Discussion of the Prior Art

In a known pin tractor assembly of the type indicated above, a pair of wheels are rotatably supported by and between two separate left-side and right-side frames that are assembled and fixed in position by screws or other fastening means.

Such a known pin tractor assembly uses a relatively large number of parts, and consequently requires a difficult and time-consuming procedure for assembling the component parts.

SUMMARY OF THE INVENTION

It is therefore an object of the present invention to provide a pin tractor assembly which is simple in construction and easy to assemble.

The above object can be achieved according to the principle of the present invention, which provides a pin tractor assembly for feeding a medium having feed perforations such that the perforations engage drive pins provided on an outer surface of a rotating endless belt which engages a pair of wheels rotatably supported between two spaced-apart frames, wherein the two spaced-apart frames are connected to each other by a connecting portion, into an integral tractor body having a slot portion in which the pair of wheels and the endless belt are accommodated, and wherein suitable means is provided for inhibiting radial movements of the pair of wheels in the slot portion of the tractor body.

In the pin tractor assembly of the present invention constructed as described above, the endless belt and the pair of wheels engaging the endless belt are positioned within the slot portion formed in the integral or one-piece tractor body, such that the radial movements of the wheels are inhibited by the inhibiting means. The tractor body includes the two spaced-apart frames, and the connecting portion which is disposed between the two frames so as to connect these two frames. The two frames and the connecting portion cooperate with each other to define the slot portion.

Since the tractor body is a one-piece structure, the endless belt, wheels and other parts of the pin tractor assembly can be easily assembled. Further, the number of parts of the pin tractor assembly can be minimized.

In one form of the pin tractor assembly of the invention, movements of the endless belt and the wheels in a direction parallel to rotating axes of the wheels are inhibited by contacts between side faces of the endless belt and wheels and opposed surfaces of the two spaced-apart frames of the tractor body.

In another form of the present invention, the connecting portion of the tractor body is disposed outside a loop of the endless belt.

In an alternative form of the invention, the connecting portion is disposed within a loop of the endless belt, and the slot portion defines an annular void around the connecting portion, so that the endless belt and the wheels are accommodated within the annular void. The connecting portion is positioned and dimensioned so that when one of opposite U-shaped ends of the endless belt engages a corresponding end of the connecting portion, the other U-shaped end of the endless belt can clear a corresponding end of at least one of the two spaced-apart frames, whereby the above-indicated other end of the endless belt can be moved into the slot portion formed in the tractor body. In this case, the size of the tractor body can be made comparatively small, since the connecting portion is located within the loop of the endless belt. Further, the endless belt can be easily positioned between the two spaced-apart frames, even if the tractor body is a one-piece structure. Preferably, the connecting portion and the endless belt are dimensioned so that when a portion of the loop of the endless belt engages a part of a periphery of the connecting portion which defines the annular void such that another portion of the loop is outside the tractor body, the pair of wheels can be accommodated within an area defined by the above-indicated another portion of the loop of the endless belt and an outer periphery of the tractor body.

According to a further form of the instant pin tractor assembly, each of the pair of wheels has a pair of bosses concentrically formed on opposite axial end faces thereof, and the two spaced-apart frames have opposed surfaces which cooperate with the connecting portion to define the slot portion. The opposed surfaces have two pairs of recesses each pair accommodating the pair of bosses of the corresponding one of the two wheels. In this form of the invention, the pair of wheels and the endless belt engaging the wheels can be tentatively maintained in the slot portion of the tractor body such that the bosses of the wheels are held within the corresponding recesses, before the wheels are connected to suitable shafts. Namely, a sub-assembly consisting of the tractor body, endless belt and pair of wheels can be prepared, for easy assembling of the pin tractor assembly.

In the above form of the invention, each recess accommodating the corresponding boss of the wheels may be formed in the corresponding one of the opposed surfaces of the two spaced-apart frames, so as to extend in a direction intersecting the slot portion, and each recess has a closed end and an open end. In this case, the wheels can be positioned in the slot portion of the tractor body, such that the bosses are inserted into the corresponding recesses, from the open end toward the closed end of the recesses.

Alternatively, each recess may be shaped so as to inhibit a radial movement of the corresponding boss when this boss is positioned within the recess. In this case, the bosses are positioned into the corresponding recesses owing to elastic deformation of the two spaced-apart frames.

In a still further form of the present invention, the pair of wheels and the two spaced-apart frames are connected rotatably relative to each other by two shafts, and these two shafts function as the inhibiting means for inhibiting the radial movements of the wheels within the slot portion of the tractor body. In this instance, the tractor body may be a member separate from a frame of an apparatus to which the tractor assembly is attached. The two shafts may be supported by the frame of the apparatus such that the two shafts are axially immovable relative to the frame, while the tractor body and the pair of wheels are axially movable relative to the two shafts. In this arrangement, suitable locking means may be provided for clamping the tractor body to at least one of the two shafts, in a selected axial position of the two shafts. Thus, where two pin tractor assemblies according to the present invention are used to feed a recording or other medium, a distance between the endless belts of two pin tractor assemblies can be adjusted depending upon the width of the medium to be fed by the tractor assemblies.

The pin tractor assembly of the present invention may further include a covering member which is supported in a cantilever manner by one of the two spaced-apart frames, so as to extend to cover a feeding surface on an upper run of the endless belt and thereby prevent the medium from being disengaged from the drive pins. At least an end portion of the covering member may consist of a pivotable member which is pivotable about a pivot axis parallel to axes of rotation of the wheels, between a closed position adjacent to the endless belt, and an open position spaced away from the closed position in a direction away from the endless belt. In this case, the pivotable portion has a free end defining one of opposite ends of the covering member from which the medium is introduced onto the upper run of the endless belt. The tractor body and the endless belt are adapted to extend beyond the free end of the pivotable portion of the covering member, in a direction from the other end of the covering member toward the above-indicated one end. According to this arrangement, the pivotable portion of the covering member is placed in its open position, when the leading end portion of the medium is set for engagement of the perforations with the drive pins on the endless belt. After the leading end portion of the medium is engaged with the drive pins on the endless belt, the pivotable portion of the covering member is closed, while the medium is finger-held against the end portion of the upper run of the belt which extends beyond the free end of the pivotable portion.

BRIEF DESCRIPTION OF THE DRAWINGS

The above and optional objects, features and advantages of the present invention will be better understood by reading the following detailed description of presently preferred embodiments of the invention, when considered in conjunction with the accompanying drawings, in which:

FIG. 3 is an elevational view in transverse cross section of the pin tractor assembly, taken at a longitudinally intermediate portion of the assembly;

FIG. 4 is an elevational view in transverse cross section of the assembly, taken at a longitudinally front end of the assembly;

FIG. 5 is an elevational view in longitudinal cross section of the assembly, taken along line A—A of FIG. 3;

FIG. 7 is a fragmentary view in cross section taken along line B—B of FIG. 6;

FIGS. 9(*a*), 9(*b*) and 9(*c*) are perspective views illustrating a procedure for assembling an endless timing belt and timing pulleys in a tractor body.

DETAILED DESCRIPTION OF THE PREFERRED EMBODIMENTS

Referring first to FIGS. 1-5, there is shown a printer equipped with one embodiment of a pin tractor assembly of the present invention adapted to feed a recording medium in the form of a paper web which has two edge perforations.

Figure 1:
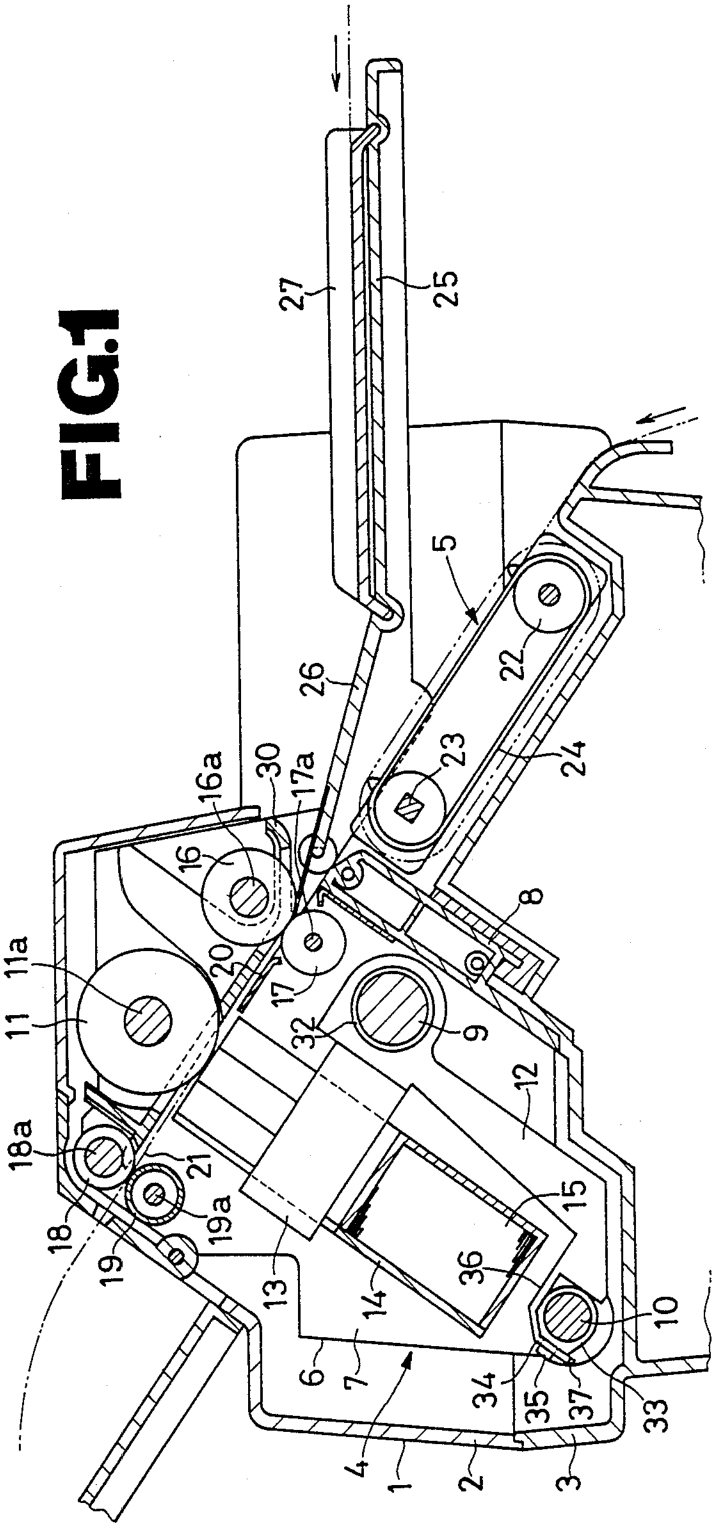
FIG. 1 is a fragmentary elevational view in cross section of a printer equipped with a tractor device including two pin tractor assemblies each constructed according to one embodiment of the present invention.
Figure 8:
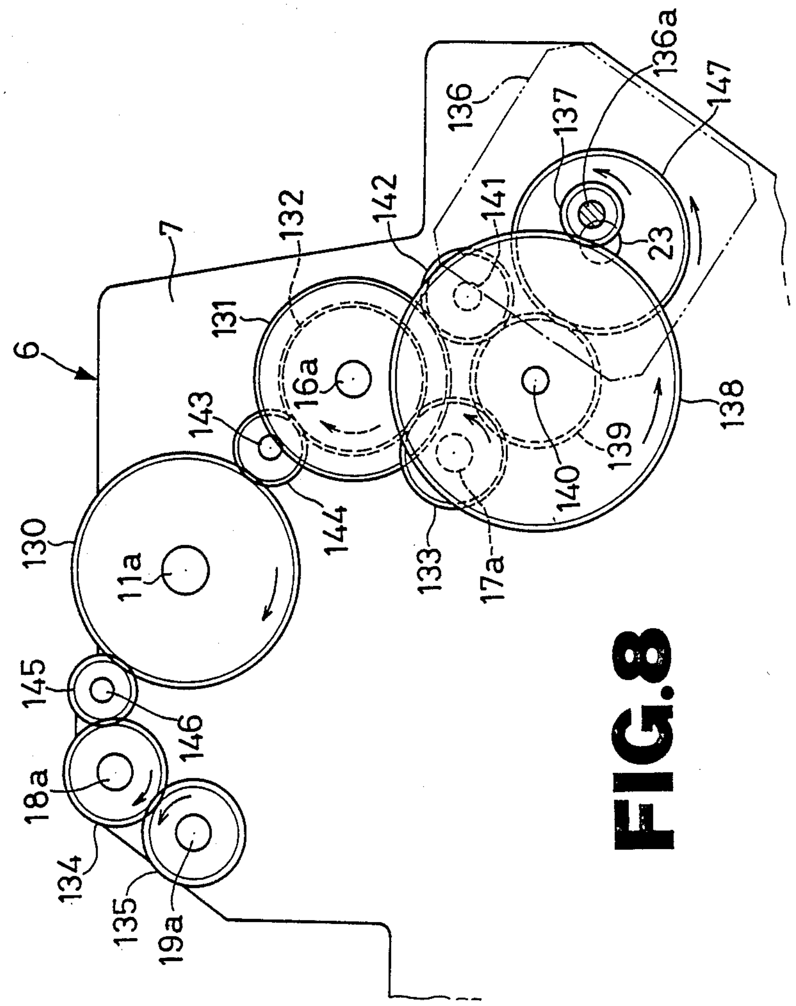
FIG. 8 is an elevational view showing a gear train incorporated in the printer of FIG. 1.

The printer has a housing 1 consisting of an upper casing 2 and a lower casing 3, which are connected together at a vertically intermediate portion of the housing, as shown in FIG. 1. The printer housing 1 accommodates a printing unit 4 in its rear portion, and a tractor device 5 in its front portion. The tractor device includes two pin tractor assemblies which are spaced apart from each other in the lateral direction of the printer. The printing unit 4 is mounted on a unit frame 6 which includes a pair of laterally spaced-apart side plates 7, a hollow bridging member 8 and two guide bars in the form of rods 9, 10. The bridging member 8 and the guide bars 9, 10 extend parallel to each other, so as to connect the side plates 7. Above the guide bars 9, 10, there is disposed a cylindrical platen 11 which is rotatably supported by and between the side plates 7. The platen 11 has a shaft **11*a* which has a gear 130 fixed at one of its opposite ends, as indicated in FIG. 8**.

The printing unit 4 includes a carriage 12 which is supported on the guide bars 9, 10 slidably in the lateral direction of the printer. The carriage 12 has a print head 13 mounted thereon such that the print head 13 extends obliquely toward the axis of the platen 11, from a lower left position with respect to the platen, so that the working surface of the print head 13 is located adjacent to the circumference of the platen 11. A ribbon cassette 14 accommodating an ink ribbon 15 is disposed between the side plates 7 of the unit frame 6. An exposed active length of the ink ribbon 15 supplied from the cassette 14 is passed through a printing position between the platen 11 and the print head 13. A printing operation by the print head 13 is effected on a recording medium such as a paper web or a cut sheet, via the ink ribbon 15, while the carriage 12 is fed in the lateral direction of the printer.

The printer has four pairs of feed rolls 16, 17, 18 and 19. The feed rolls 16 and 17 are disposed upstream of the platen 11 as viewed in the feeding direction, while the feed rolls 18 and 19 are disposed downstream of the platen 11. The feed rolls 16 and 18 are positioned on one side of a line tangent to the circumference of the platen 11 at the printing position. The feed rolls 17 and 19 are positioned on the other side of the tangent line. As shown in FIG. 8, a large gear 131 and a small gear 132 are fixed at one end of a shaft **16*a* on which the feed rolls 16 are supported. Further, a gear 133, a gear 134 and a gear 135 are fixed at the corresponding ends of a shaft 17*a*, a shaft 18*a* and a shaft 19*a* for the feed rolls 17, 18 and 19**, respectively.

A drive motor 136 is mounted on one of the two side plates 7. The motor 136 has an output shaft **136*a* which has a gear 137 fixed thereto. A large gear 138 and a small gear 139 are fixed on a shaft 140, such that the large gear 138 meshes with the gear 137 on the output shaft 136***a*, while the small gear 139 is connected to the gear 131 on the shaft 16*a*, via an intermediate gear 142 on a shaft 141. An intermediate gear 144 on a shaft 143 connects the gear 132 on the shaft 16*a*, and the gear 130 on the platen shaft 11*a*. An intermediate gear 145 fixed on a shaft 146 connects the gear 134 on the shaft 18*a*, and the gear 130 on the platen shaft 11*a*. Further, the gears 134 and 135 on the shafts 18*a* and 19*a* mesh with each other.

With the drive motor 136 operated, the feed rolls 16, 17, 18 and 19 and the platen 11 are rotated in the paper feeding direction, through the gear train described above, so that the loaded recording medium is fed along a paper path 21, while being nipped by the feed rolls. The paper path 21 which passes the printing station is defined by the nips of the feed rolls 16–19, and a lower paper guide 20 and an upper paper guide 30 which are disposed on both sides of the tangent line indicated above. The paper path 21 is substantially straight, and is inclined such that the paper-receiving end upstream of the printing position is lower than the paper-outgoing end downstream of the printing position.

Figure 2:
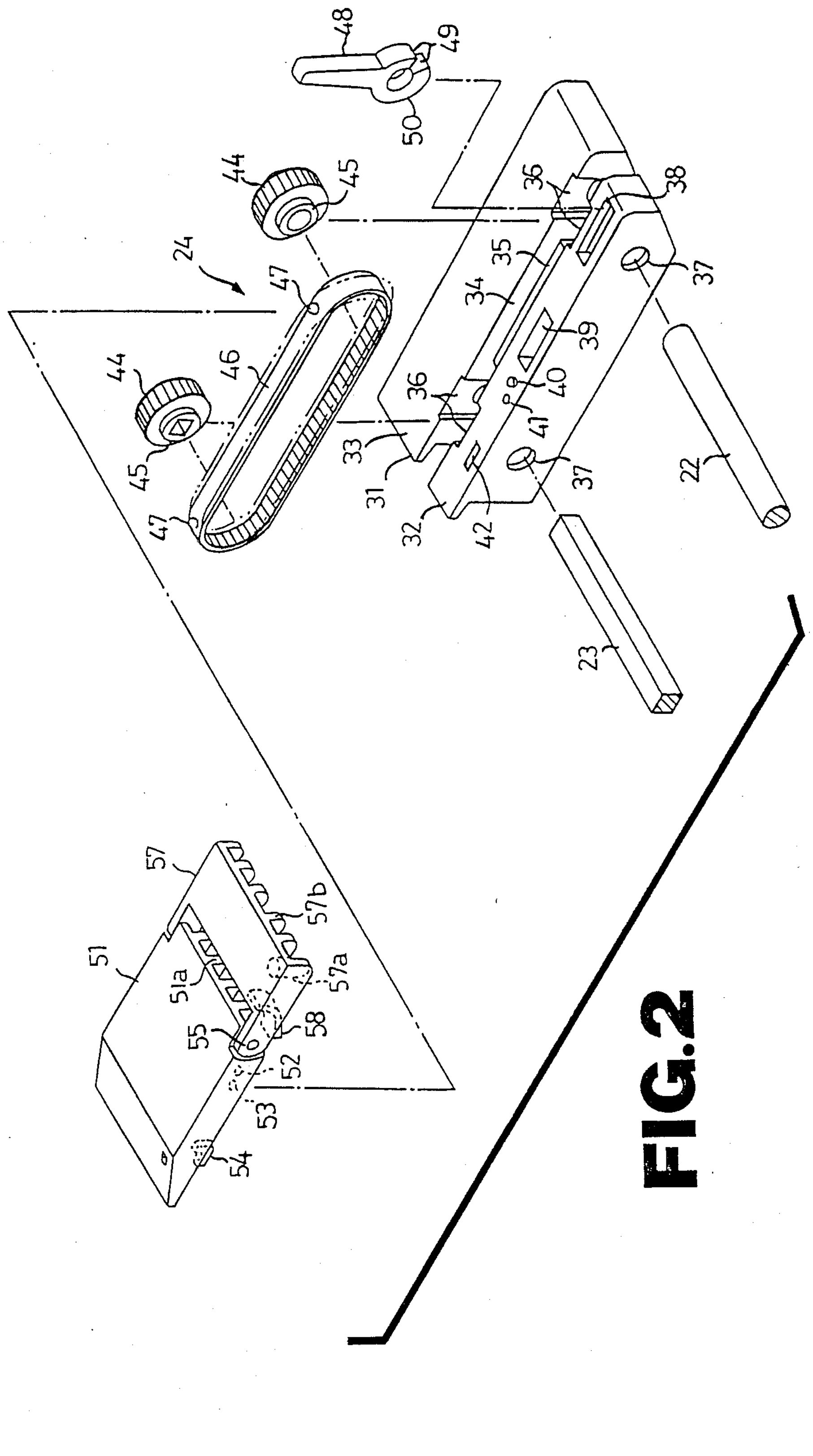
FIG. 2 is an exploded perspective view of one of the two pin tractor assemblies of FIG. 1.

The tractor device 5 includes a guide shaft 22 and a drive shaft 23 which extend in the lateral direction of the printer, and a pair of pin tractors 24 which are spaced apart from each other in the lateral direction and are movable relative to each other to adjust the distance therebetween, depending upon the width of the recording medium. FIG. 2 shows the left-hand side pin tractor 24. The pin tractors 24 have upper surfaces which are inclined so as to be flush with the inclined paper path 21. The upper surfaces of the pin tractors 24 disposed upstream of the paper path 21 in the feeding direction define a paper loading path for a paper web.

Each of the left and right pin tractors 24 includes a pair of timing pulleys or wheels 44 supported by the guide and drive shafts 22, 23, and an endless timing belt 46 which connects the two timing wheels 44, as described below in detail. The endless timing belt 46 has a multiplicity of drive pins 47 arranged in a row on its outer surface, so that the drive pins 47 engage the perforations formed in the paper web. As shown in FIG. 8, the drive shaft 23 has a gear 147 fixed thereon. The gear 147 meshes with the small gear 139 on the shaft 140 indicated above, so that the endless belt 46 of the pin tractor 24 rotated by a rotating movement of the drive shaft 23 during operation of the drive motor 136, whereby the paper web is introduced into the paper path 21 leading to the printing position.

The printer is also equipped with a manual paper inserting guide 25 disposed above the tractor device 5. This guide 25 has an upper guide surface 26 and is supported between the side plates 7 of the unit frame 6, such that the guide surface 26 extends substantially horizontally and intersects the paper path 21 at a suitable angle. The inserting guide 25 is used to manually insert a cut sheet into the paper path 21 via the guide surface 26. The guide 25 has a pair of side plates 27 which are movable relative to each other in a direction perpendicular to the sheet inserting direction. When the cut sheet is inserted, the sheet is guided at its opposite edges by the side plates 27.

The construction of each pin tractor 24 will be described in detail by reference to FIGS. 2–5, wherein an integral or one-piece tractor body is indicated generally at 31. This tractor body 31 is formed of a suitable synthetic resin such as polycarbonate. The tractor body 31 consists of a pair of spaced-apart frames 32, 33, and a connecting portion 35 which connects the spaced-apart frames 32, 33 such that a slot portion in the form of an annular void 34 is formed between the two frames 32, 33 and around the periphery of the connecting portion 35. The annular void 34 has a suitable width between the frames 32, 33, which will be understood from the following description. Each of the two spaced-apart frames 32, 33 consists of an inverted U-shaped structure which has an upper wall defining the paper guiding surface, and a pair of side walls which extend downwardly from the opposite edges of the upper wall.

The connecting portion 35 is aligned with substantially central portions of the opposed surfaces of the two spaced-apart frames 32, 33. Accordingly, the annular void 34 includes an upper and a lower portion for receiving the upper and lower runs of the loop of the endless timing belt 46, and a front and a rear portion for receiving the front and rear timing wheels 44. The opposed surfaces of the two frames 32, 33 have a first pair of opposed recesses 36 formed in the front end portions, and a second pair of opposed recesses 36 in the rear end portions. Each of the four recesses 36 communicates with the annular void 34, and is open at its upper end and closed at its lower end. The two spaced-apart frames 32, 33 have holes 37 formed transversely through the side walls described above, such that the holes 37 pass the recesses 36. The guide and drive shafts 22, 23 extend through these holes 37. The diameter of each hole 37 is sufficiently smaller than that of the dimension of the recesses 36 in the longitudinal direction of the tractor body 31 (in the paper feeding direction).

The top wall of the left-hand side frame 32 of the tractor body 31 has a lever aperture 38, a recessed portion 39, a locator pin 40, a small hole 41 and an engagement aperture 42, which are formed in the order of description, from the front end toward the rear end of the frame 32. Adjacent to the lever aperture 38, an abutment wall 43 (FIG. 5) is formed between the side walls of the frame 32. The recessed portion 39 has an arcuate bottom wall following an arc of a circle having a center on the center of support pins 55 which will be described. As shown in FIG. 5, the arcuate bottom wall of the recessed portion 39 has two engagement notches 39*a*, 39*b* which are spaced apart from each other along the arc of the circle indicated above.

Each of the two timing pulleys or wheels 44 has teeth on its outer surface, and two concentric cylindrical bosses 45 which protrude from the opposite axial end faces. Each wheel 44 has a center hole formed through the bosses 45, so that the appropriate shaft 22, 23 extends through the wheel. The bosses 45 have an outside diameter which is slightly smaller than the dimension of the corresponding recesses 36 in the longitudinal direction of the tractor body 31, but is considerably greater than the diameter of the holes 37. The two wheels 44 are rotatably supported within the annular void 34 between the two frames 32, 33 such that the bosses 45 are accommodated within the respective recesses 36.

The endless timing belt 46 is formed of a flexible material in a loop, with the multiple drive pins 47 on the outer surface. As described above, these drive pins 47 are adapted to engage the corresponding row of perforations formed along one of opposite edges of the paper web. The endless belt 46 has internal teeth which engage the teeth on the wheels 44. Namely, the two wheels 44 engage the opposite U-shaped ends of the loop of the endless belt 46. As described later in detail, the guide and drive shafts 22, 23 are inserted through the holes 37 in the frames 32, 33, and through the holes in the corresponding wheels 44 while tentatively positioned within the annular void 34. With the tractor body 31 and the wheels 44 thus supported on the guide and drive shafts 22, 23, the tractor body 31 is slidable on the shafts 22, 23 together with the wheels 44 and the endless belt 46, in the lateral direction of the printer, so that the distance between the two pin tractors 24 can be adjusted to the specific width of the paper web to be loaded by the tractor device 5.

The tractor body 31 is provided with a lock lever 48 having a bifurcated base 49 which pivotally engages the guide shaft 22, at a position between the two side walls of the left-hand side frame 32, as indicated in FIG. 4. The lock lever 48 has a handle portion which extends above the upper surface of the frame 32, through the lever aperture 38. The bifurcated base 49 is formed with an outer cam surface 50 which faces the abutment wall 43 in the frame 32. The cam surface 50 is formed such that a distance between the surface 50 and the center of the guide shaft 22 gradually increases in the substantially circumferential direction of the shaft 22. When the lock lever 48 is pivoted in the clockwise direction as seen in FIG. 5, the radially outer end portion of the cam surface 50 is brought into abutting contact with the surface of the abutment wall 43. Thus, the tractor body 31 can be clamped or locked to the guide shaft 22, at a desired longitudinal position of the shaft 22.

On the tractor body 31, there is disposed a covering member 51, 57 which consists of a fixed cover 51 and a pivotable cover 57. The fixed cover 51 is positioned so as to cover the rear portion of the tractor body 31, extending between the two spaced-apart frames 32, 33. The fixed cover 51 has a locator hole 52, a tapped hole 53 and an engagement lug 54, which are formed in or on the lower surface, along the left-hand side edge. The holes 52, 53 and engagement lug 54 correspond to the locator pin 40, small hole 41 and engagement aperture 42, respectively, which are formed in the left-hand side frame 32. The fixed cover 51 further has a pair of support pins 55 at its front end. These pins 55 protrude outwardly from the side walls of the fixed cover 51. When the fixed cover 51 is mounted on the tractor body 31, the engagement lug 54 is inserted through the engagement aperture 42 for abutting contact with the lower surface of the top wall of the frame 32, and the locator pin 40 is fitted in the locator hole 52. In this condition, a screw 56 is inserted through the small hole 41 from under the top wall of the frame 32, and threaded into the tapped hole 53 in the fixed cover 51. Thus, the fixed cover 51 is fixed on its left-hand side to the left-hand side frame 32, such that the fixed cover 51 defines a suitable clearance to the upper run of the endless belt 46 and the guide surface on the other frame 3, for guiding the paper web on the tractor body 31.

The pivotable cover 57 is pivotally connected at its rear end to the fixed cover 51, such that the pair of support pins 55 indicated above engages holes formed in a pair of arms which extend rearwardly from the rear end of the pivotable cover 57. The pivotable cover 57 is formed at its left-hand side end with an elastic extension 58 which protrudes downwardly from the lower surface, so as to engage the recessed portion 39 formed in the frame 32. The pivotable cover 57 is pivotable about the support pins 55, between a closed position indicated in solid line in FIG. 5, and an open position indicated in broken line in the same figure. The pivotable cover 57 is selectively maintained in the closed and open positions, with the free end of the elastic extension 58 held in engagement with the notches 39*a*, 39*b* of the recessed portion 39, respectively.

In the closed position wherein the free end of the elastic extension 58 is biased upwardly by the arcuate bottom wall of the recessed portion 39 at its notch 39*a*, the free end of the pivotable cover 57 is downwardly biased, whereby a tab 57*a* provided at the left-hand side end of the cover 57 so as to extend downwardly from the lower surface is held in pressed contact with the upper surface of the frame 32. It will be understood that the pivotable cover 57 provides the above-indicated clearance with respect to the upper run of the endless belt 46 and the upper surface of the right-hand side frame 33, when the cover 57 is placed in the closed position.

The fixed and pivotable covers 51, 57 of the covering member have a plurality of ribs 51*a*, 57*b* which run in the longitudinal direction (in the paper feeding direction). The ribs 51*a* are aligned with the respective ribs 57*b*. The two opposed ribs of these ribs 51*b*, 57*a* which are located above and adjacent to the upper run of the endless belt 46 are spaced apart from each other by a distance smaller than the width of the belt 46, but the drive pins 47 are located between these two ribs 51*b*, 57*a*. Thus, the paper web is prevented by the ribs 51*b*, 57*a* from being disengaged from the drive pins 47.

The fixed and pivotable covers 51, 57 are made of a transparent synthetic resin material, so that the operator of the printer may check to see whether the drive pins 47 correctly engage the edge perforations in the paper web.

The total longitudinal dimension of the fixed and pivotable covers 51, 57, i.e., the length of the covering member 51, 57 is slightly smaller than the length of the frames 32, 33, so that the endless belt 46 can be easily loaded by the paper web while the pivotable cover 57 is placed in the open position, and so that the lock lever 48 provided in front of the free end of the pivotable cover 57 can be operated. When the paper web is loaded, the leading end portion of the web is engaged with the drive pins 47 on the endless belt 46, and then the web is finger-pressed against the upper surface of the tractor body 31 (upper run of the belt 46 and frame 33), at a position outside the coverage of the pivotable cover 57, when the cover 57 is restored to the closed position.

Each of the pin tractors 24 described above cooperates with the covering member 51, 57 to provide a pin tractor assembly. As previously described, the tractor device 5 provided on the printer has two pin tractor assemblies.

There will be described a procedure for assembling the pin tractor 24 constructed as described above. Initially, it is noted that the dimension of the loop of the endless belt 46 as finally installed is smaller than the external dimension of the frames 32, 33, but is sufficiently greater than the external dimension of the connecting portion 35, as seen in the side elevational view. The procedure for positioning the endless belt 46 into the annular void 34 is based on this recognition. Described more specifically, the endless belt 46 is initially elastically shaped as indicated in FIG. 9(*a*), and one of the opposite U-shaped ends of the loop of the thus shaped endless belt 46 is positioned within the annular void 34, and is brought into contact with the corresponding one of the opposite ends of the connecting portion 35. Namely, the corresponding end of the frame 32, for example, is passed through the loop of the endless belt 46. Then, the loop of the belt 46 is further stretched so that the other end of the U-shaped end of the loop may clear the corresponding end of the frame 32, for example. Thus, the endless belt 46 is positioned within the annular void 34 around the connecting portion 35 between the two frames 32, 33. Then, the endless belt 46 is pulled upward so as to take a shape as shown in FIG. 9(*b*), wherein a portion of the loop of the belt 46 engages the lower peripheral surface of the connecting portion 35, and another portion of the loop is positioned above the upper surface of the tractor body 31. The connecting portion 35 and the endless belt 46 are dimensioned so that the two wheels 44 can be accommodated within the exposed portion of the loop outside the tractor body 31. In this condition, one of the two timing wheels 44 is once positioned within the loop of the belt 46, and is moved right above the open end of the respective recesses 36 on one side of the connecting portion 35. The wheel 44 is then moved downward into the annular void 34, with the bosses 45 being guided through the recesses 36, as indicated in FIG. 9(*c*). Similarly, the other timing wheel 44 is positioned on the other side of the connecting portion 35, with the bosses 45 accommodated in the respective recesses 36. The endless belt 46 thus positioned within the annular void 34 is almost in an operable condition.

After the covering member consisting of the fixed and pivotable covers 51, 57 and the lock lever 48 are mounted on or set in the tractor body 31, the guide shaft 22 and the drive shaft 23 are inserted through the timing wheels 44, through the holes 37 in the frames 32, 33. As a result, the two wheels 44 are supported directly by the guide and drive shafts 22, 23, in slidable engagement with these shafts, and are therefore positioned in place within the annular void 34, in alignment with the recesses 36 formed in the frames 32, 33. Thus, the instant pin tractor 24 is relatively easy to assemble. That is, the pin tractor 24 does not require a conventionally required cumbersome procedure wherein each of two separate frames is secured in position with screws or other fasteners after timing wheels are positioned between the two frames.

In the thus assembled pin tractor 24 wherein the wheels 44 are supported directly by the shafts 22, 23, radial movements of the wheels 44 within the annular void 34 are inhibited by the guide and drive shafts 22, 23. Thus, the shafts 22, 23 function as means for inhibiting the radial movements of the wheels 44. That is, the outer circumference of the bosses 45 of the wheels 44 is kept spaced away from the wall surfaces which define the recesses 36. Further, since the wheels 44 are rotated with only the axial end faces of the bosses 45 in contacting relation with the opposed surfaces of the recesses 36, the friction between the wheels 44 and the frames 32, 33 is reduced, and at the same time the axial movements of the wheels 44 are prevented due to contact of the bosses 45 with the surfaces of the recesses 36. Similarly, the movements of the endless belt 46 in the direction parallel to the shafts 22, 23 are inhibited due to contact of the side faces of the belt with the opposed surfaces of the frames 32, 33.

In the present embodiment wherein the covering member consists of the two portions, i.e., fixed and pivotable covers 51, 57 which cooperate to cover the tractor body 31, the paper web can be readily loaded onto the endless belt 46 by operating only the front pivotable portion 57 into its open position. This arrangement does not suffer from an otherwise possible interference between a covering member and the manual paper inserting plate 25 located above the pin tractor 24 as shown in FIG. 1. Further, since the frames 32, 33 and the endless belt 46 extend toward the front of the printer beyond the free end of the closed pivotable cover 57, as indicated in FIG. 5, the leading portion of the paper web may be finger-pressed against the front end portions of the upper surfaces of the frames 32, 33 and endless belt 46, when the pivotable cover 57 is closed after the paper web is suitably engaged with the drive pins 47 on the belt 46. Consequently, the loading of the paper web can be accomplished with ease and precison.

Figure 6:
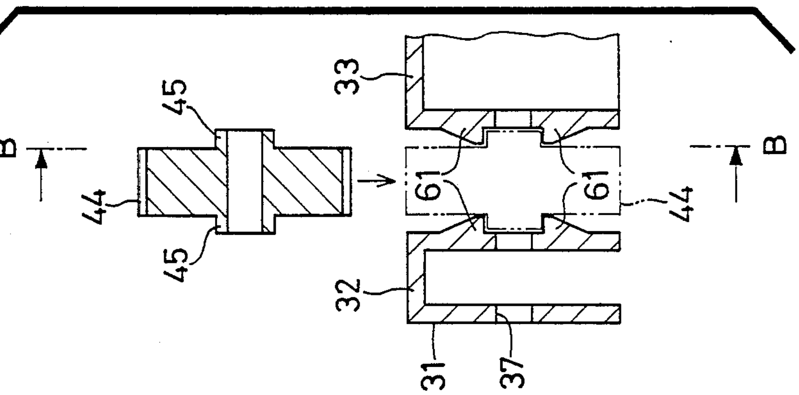
FIG. 6 is a fragmentary exploded view in cross section of a pin tractor assembly according to another embodiment of the invention.

Referring to FIGS. 6 and 7, there is illustrated another embodiment of the present invention wherein the opposed surfaces of the two frames 32, 33 are formed with modified recesses 62 in place of the recesses 36 provided in the preceding embodiment. More specifically, each recess 62 is defined by one upper projection 61 formed above the inner open end of the corresponding hole 37, and two lower projections 61 formed below the inner open end of the hole 37. These three projections 61 are positioned such that they do not overlap each other when viewed in the direction normal to the upper surface of the tractor body 31. Like the recesses 36, the recesses 62 accommodate the bosses 45 of the wheels 44. When the wheels 44 are positioned in place between the frames 32, 33, the two bosses 45 are forced into the corresponding recesses 62, due to elastic deformation of the projections 61. With the wheels 44 positioned in place, there exists a small clearance between the outer circumference of the bossses 45 and the inner surfaces of the projections 61. However, the radial movements of the wheels 44 are substantially inhibited by the projections 61. In this embodiment, too, the wheels 44 are supported directly by the guide and drive shafts 22, 23 inserted through the holes 37 formed in the frames 32, 33. Therefore, the outer circumference of the bosses 45 is kept away from the projections 61, and only the end faces of the bosses 45 are held in contact with the surfaces of the frames 32, 33.

Figure 10:
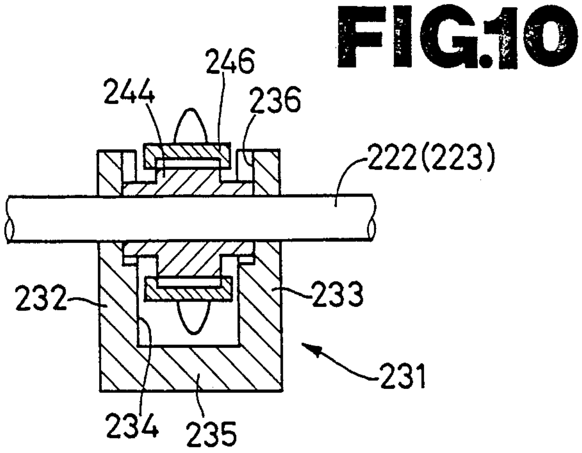
FIG. 10 is an elevational view showing a further embodiment of the invention.

Referring further to FIG. 10, there is shown a further embodiment of the invention, wherein each of the two pin tractors uses a one-piece tractor body 231 which is structurally different from the tractor body 31 used in the preceding embodiments. The tractor body 231 includes two spaced-apart frames 232, 233, and a connecting portion 235 which connects the two frames 232, 233 at the lower ends of the frames. In other words, the connecting portion 235 forms the bottom wall of the U-shaped tractor body 231. While the connecting portion 31 of the preceding embodiments is located within the loop of the endless belt 46, the connecting portion 235 of the present embodiment is located outside the loop of an endless timing belt 246. Namely, the side walls 232, 233 and the bottom wall 235 of the U-shaped tractor body 231 define a slot portion in the form of a rectangular void 234, in which two timing wheels 244 and the endless belt 246 with drive pins 247 are accommodated. The side frames 232, 233 have recesses 236 similar to the recesses 36, so that the bosses of the wheels 244 directly supported by guide and drive shafts 222, 223 are accommodated in the respective recesses 236. While the instant tractor body 231 tends to be larger in size than the tractor body 31, the tractor body 231 permits easier installation of the wheels 244 and endless belt 246. In this embodiment, too, the radial movements of the wheels 244 are inhibited by the shafts 222, 223, and the one-piece tractor body 231 can be readily secured.

While the present invention has been described in its presently preferred embodiments, it is to be understood that the invention is not limited to the details of the illustrated embodiments, but may be embodied with various changes, modifications and improvements which may occur to those skilled in the art, without departing from the spirit and scope of the invention defined in the following claims.

What is claimed is:

1. A pin tractor assembly for feeding a medium having feed perforations such that the perforations engage drive pins provided on an outer surface of a rotating endless belt having opposite U-shaped ends at which said endless belt engages at least one wheel rotatably supported between two spaced-apart frames, wherein the improvement comprises:

said two spaced-apart frames being connected to each other by a connecting portion, into an integral tractor body having an annular void around said connecting portion, said annular void accommodating said at least one wheel and said endless belt;

said connecting portion being disposed within a loop of said endless belt, and positioned and dimensioned so that when one of said opposite U-shaped ends of said endless belt engages a corresponding end of said connecting portion, the other U-shaped end of the endless belt can clear a corresponding end of at least one of said two spaced apart frames, whereby said other end of the endless belt can be moved into said annular void formed in said tractor body;

said connecting portion and said endless belt being dimensioned so that when a portion of the loop of said endless belt engages a part of a periphery of said connecting portion defining said annular void such that another portion of said loop is outside said tractor body, said at least one wheel can be accommodated within another portion of said loop outside said tractor body; and said annular void having a portion which permits said at least one wheel to be positioned thereinto in a direction transverse to a direction of feed of said medium.

2. A pin tractor assmelby according to claim 1, wherein each of said at least one wheel has a pair of bosses concentrically formed on opposite axial end faces thereof, and said two spaced-apart frames have opposed surfaces which cooperate with said connecting portion to define said annular void, said opposed surfaces having at least one pair of recesses each pair accommodating said pair of bosses of the corresponding one of said at least one wheel, each of said recesses being formed in said opposed surfaces of said two spaced-apart frames such that said each recess extends in a direction transverse to the direction of feed of said medium from a part of an outer periphery of the corresponding frame which is parallel to said direction of feed of said medium, said each recess being closed at one of opposite ends thereof and open at the other end at said part of the outer periphery of said corresponding frame, each of said bosses of said at least one wheel being positioned into the corresponding one of said recesses, from the open end toward the closed end of said corresponding one recess.

3. A pin tractor assembly according to claim 1, wherein each of said at least one wheel and said two spaced-apart frames are connected rotatably relative to each other by a shaft, said shaft inhibiting radial movements of said each wheel in said annular void of said tractor body.

4. A pin tractor assembly according to claim 3, wherein said at least one wheel consists of two wheels which are rotatably connected to said two spaced-apart frames by respective two shafts, one of said two wheels being rotatable with the corresponding one of said two shafts, while the other wheel being freely rotatably relative to the other shaft.

5. A pin tractor assembly according to claim 4, wherein said tractor body is separate from a frame of an apparatus to which the frame assembly is attached, and said two shafts are supported by said frame of said apparatus such that said two shafts are axially immovable relative to said frame, and such that said tractor body and said pair of wheels are axially movable relative to said two shafts, said pin tractor assembly further comprising locking means for locking said tractor body to said other shaft, in a selected axial position of said other shaft, said locking means having a hole through which said other shaft is inserted when said other shaft is inserted through said tractor body and said two wheels during assembly of said endless belt and said two wheels within said annular void.

6. A pin tractor assembly according to claim 1, further comprising a covering member which is supported in a cantilever manner by one of said two spaced-apart frames, so as to extend to cover a feeding surface on an upper run of said endless belt and an upper surface of the other of said two frames so as provide a clearance between said covering member and said upper surface of said other frame, for permitting said medium to be fed through said clearance so as to prevent said medium from being disengaged from said drive pins, said covering member including a fixed portion supported by said one frame and a pivotable portion which is pivotally connected to an adjacent end of said fixed portion about a pivot axis parallel to axes of rotation of said at least one wheel, between a closed position adjacent to said endless belt, and an open position spaced away from said closed position in a direction away from said endless belt.

7. A pin tractor assembly according to claim 6, wherein said pivotable portion has a free end defining one of opposite ends of said covering member from which said medium is introduced onto said upper run of said endless belt, said tractor body and said endless belt extending beyond said free end of said pivotable portion in a direction opposite to the direction of feed of said medium.

8. A pin tractor assembly for feeding a medium having feed perforations such that the perforations engage drive pins provided on an outer surace of a rotating endless belt having opposite U-shaped ends at which said endless belt engages a pair of wheels rotatably supported between two spaced-apart frames, wherein the improvement comprises:

said two spaced-apart frames being connected to each other by a connecting portion, into an integral tractor body having an annular void around said connection portion, said annular void accomodating said pair of wheels and said endless belt;

inhibiting means for inhibiting radial movements of said pair of wheels in said annular void of said tractor body;

said connecting portion being disposed within a loop of said endless belt, and positioned and dimensioned such that when one of said opposite U-shaped ends of said endless belt engages a corresponding end of said connecting portion, the other U-shaped end of the endless belt can clear a corresponding end of at least one of said two spaced-apart frames, whereby said other end of the endless belt can be moved into said annular void formed in said tractor body;

each of said pair of wheels having a pair of bosses concentrically formed on opposite axial end faces thereof, and said two spaced-apart frames having opposed surfaces which cooperate with said connecting portion to define said annular void, said opposed surfaces having two pairs of recesses each pair accommodating said pair of bosses of the corresponding one of said wheels; and each of said recesses being shaped so as to inhibit a radial movement of the corresponding boss being positioned into said each recess owing to elastic deformation of said two spaced-apart frames.

9. A pin tractor assembly for feeding a medium having feed perforations such that the perforations engage drive pins provided on an outer surface of a rotating endless belt having opposite U-shaped ends at which said endless belt engages at least one wheel rotatably supported between two spaced-apart frames, wherein the improvement comprises, an integral tractor body including said two spaced-apart frames and a connecting portion formed integrally with said two spaced-apart frames so as to connect said frames, said frames and said connecting portion being formed of a same material;

said integral tractor body having a slot portion which accommodates said at least one wheel and said endless belt, said slot portion being positioned and dimensioned to permit said endless belt and said at least one wheel to be positioned into said slot portion from outside said tractor body; and a drive shaft for rotating one of said at least one wheel such that said drive shaft inhibits radial movements of said one wheel in said slot portion of said integral tractor body.

10. A pin tractor assembly according to claim 9, wherein said two spaced-apart frames include respective holes, and said one wheel has a pair of bosses formed at opposite axial ends thereof, said bosses having an outside diameter larger than said holes in said frames, said drive shaft extending through said holes in said frames and said one wheel in an axial direction parallel to an axis of rotation of said one wheel, such that movements of said endless belt and said one wheel in said axial direction are inhibited by contacts between end faces of said bosses of said one wheel and opposed surfaces of said two spaced-apart frames.

11. A pin tractor assembly according to claim 9, wherein said connecting portion is disposed outside a loop of said endless belt.

12. A pin tractor assembly according to claim 9, wherein said connecting portion is disposed within a loop of said endless belt, and said slot portion defines an annular void around said connecting poriton, said endless belt and said at least one wheel being accommdated within said annular void, said connecting portion being positioned and dimensioned so that when one of said opposite U-shaped ends of said endless belt engages a corresponding end of said connecting portion, the other of said opposite U-shaped ends of the endless belt can clear a corresponding end of at least one of said two spaced-apart frames, whereby said other end of the endless belt can be moved into said annular void formed in said tractor body, said connecting portion and said endless belt being dimensioned so that when a portion of the loop of said endless belt engages a part of a periphery of said connecting portion defining said annular void such that another portion of said loop is outside said tractor body, said at least one wheel can be accommodated within another portion of said loop outside the tractor body, said annular void having a portion which permits said at least one wheel to be positioned thereinto in a direction transverse to a direction of feed of said medium.

* * * * *